May 5, 1959  L. E. DE NEERGAARD  2,885,256
RECORDING SYSTEM AND METHOD FOR DISPLACED TRACES
Filed Dec. 16, 1955  3 Sheets-Sheet 1
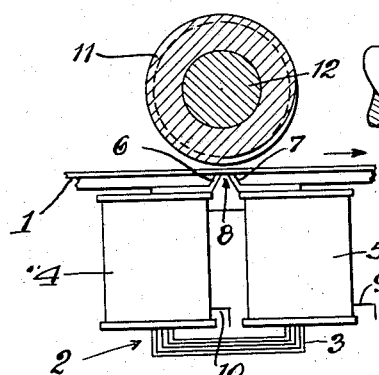
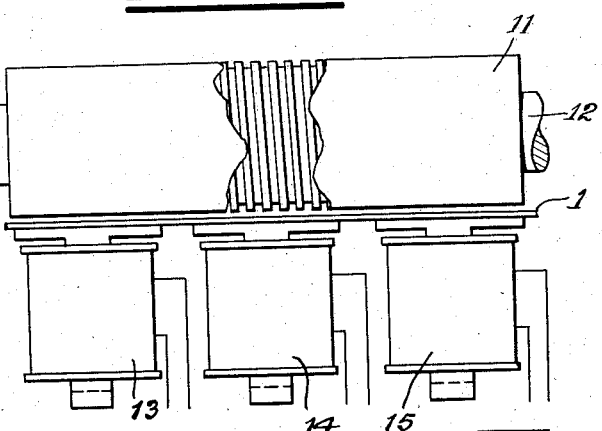
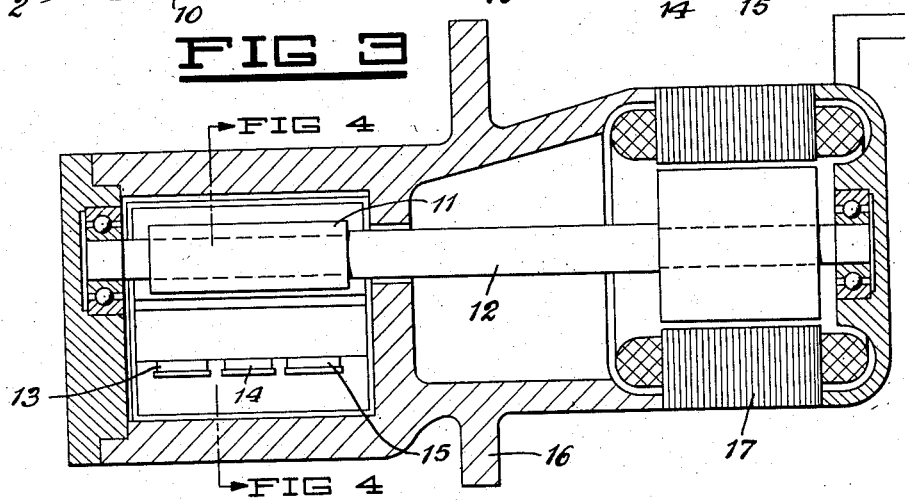
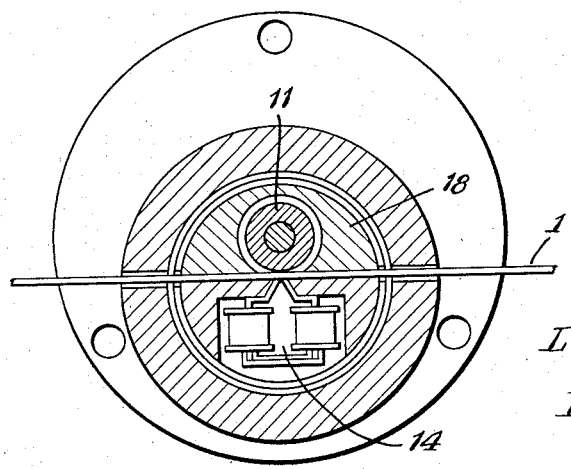
INVENTOR
Leif Eric De Neergaard
BY
Parker & Carter
Attorneys

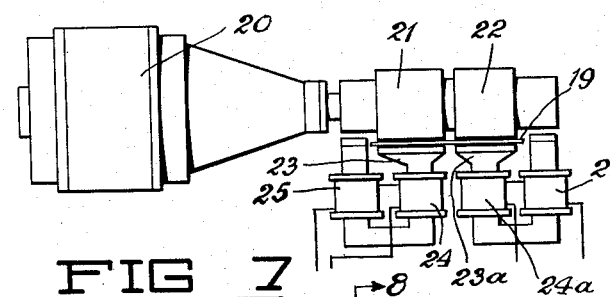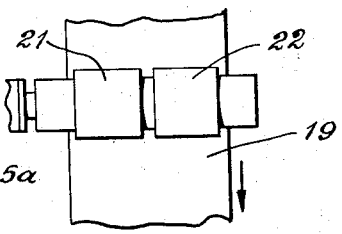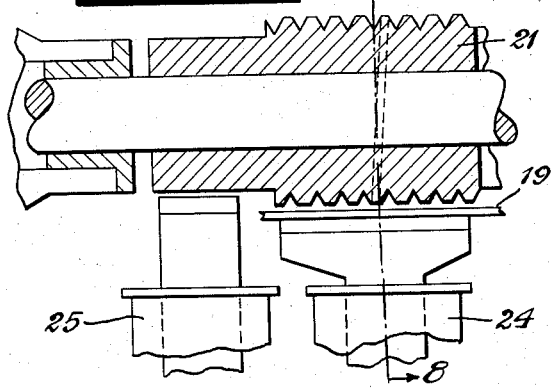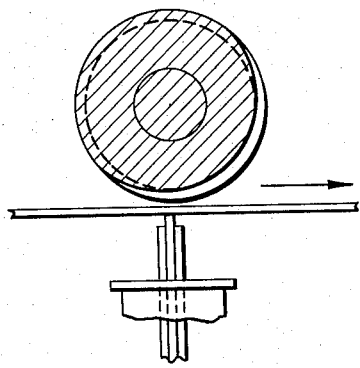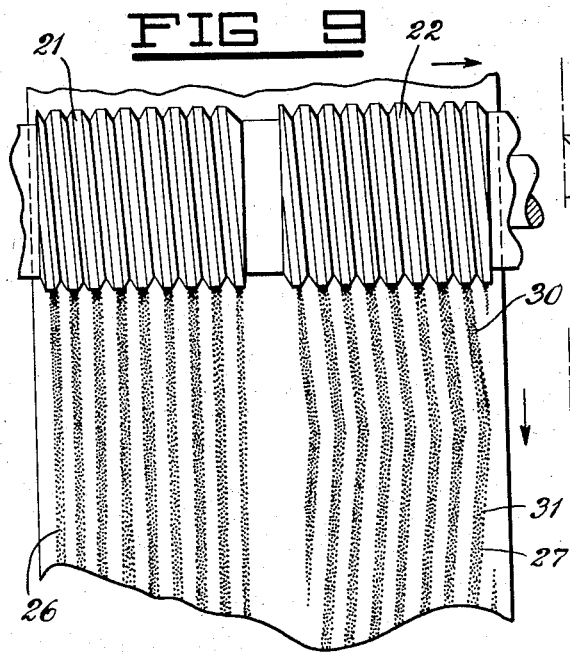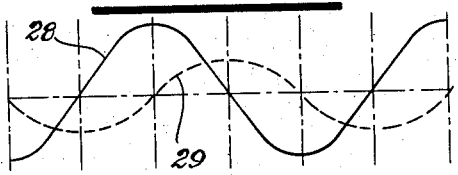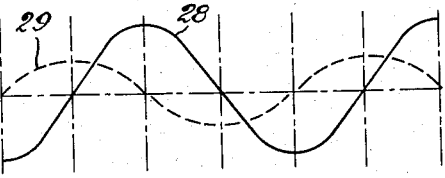

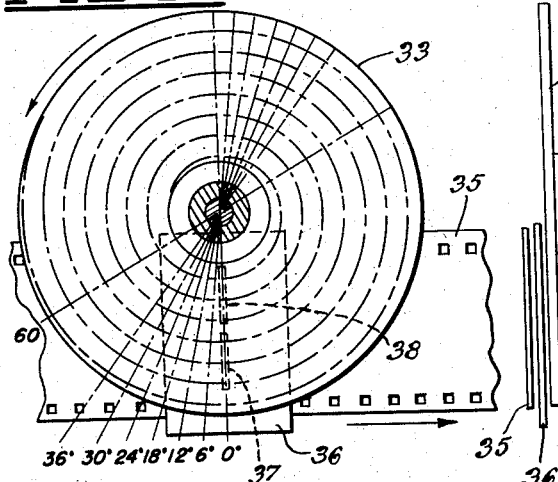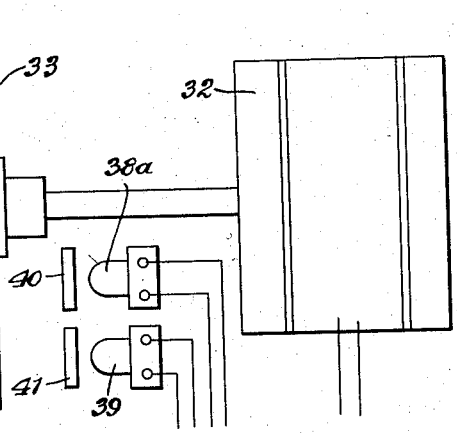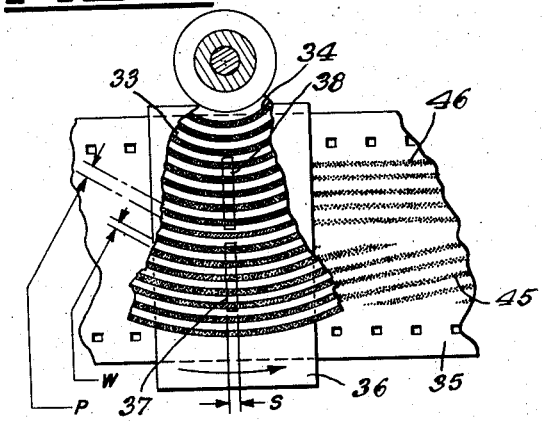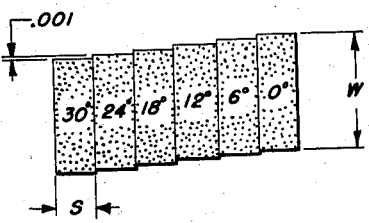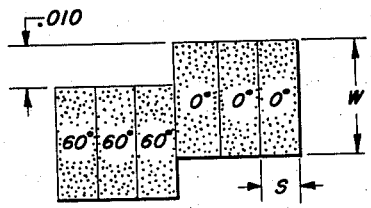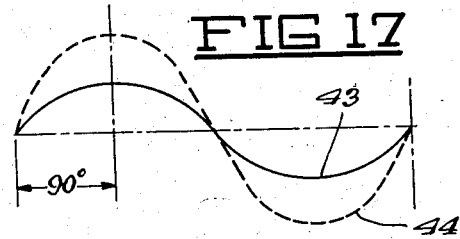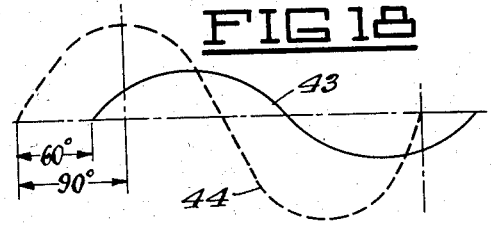

United States Patent Office 2,885,256
Patented May 5, 1959

2,885,256

RECORDING SYSTEM AND METHOD FOR DISPLACED TRACES

Leif Eric de Neergaard, Chicago, Ill., assignor to Frederic W. Olmstead, Washington, D.C., Hans W. Trechsel, Madison, Wis., Deryck A. Gerard, South Minneapolis, and John J. Kojis, St. Louis Park, Minn., Norman S. Parker, Evanston, and Malcolm S. Bradway, Chicago, Ill., and said Leif Eric de Neergaard, as trustees; The Northern Trust Company, executor of said de Neergaard, deceased Application December 16, 1955, Serial No. 553,469

22 Claims. (Cl. 346—74)

This invention is directed to a new and improved system of recording traces on a control record. It is particularly useful in recording displaced traces such as are found, for example, in my United States Patent Number 2,628,539, issued on February 17, 1953.

One object of the present invention is a new and improved method for translating changes in a variable into a proportional displacement of flux transmissive traces on a control record.

Another purpose is a new and improved method of translating the phase displacement of one cyclically varying signal relative to another into a proportional transverse displacement of a trace on a control record. Thus the phase displacement between the two signals or phase differential between the two signals may represent changes in a variable such as speed, distance, voltage, temperature, etc.

Another purpose is a method for recording displaced traces on a control record in such a manner that the normal pickup structures associated with the record may be employed during the recording process.

Other objects will appear from time to time in the course of the ensuing specification and claims.

Referring generally now to the drawings,

Figure 1 illustrates a side elevational view of one structure utilized in the invention;

Figure 2 represents a front elevation of the structure illustrated in Figure 1;

Figure 3 is an assembly view, with parts being shown in section for purposes of clarity, of one embodiment of the invention;

Figure 4 is a sectional view taken along the section lines 4—4 of Figure 3;

Figure 5 is a front elevation of another species of my improved method;

Figure 6 is a plan view of a portion of the device illustrated in Figure 5;

Figure 7 is an enlarged sectional view of certain portions of the device illustrated in Figure 5;

Figure 8 is a sectional view of the device shown in Figure 7 taken along the section lines 8—8 of Fig. 7;

Figure 9 is an enlarged plan view similar to that illustrated in Figure 6;

Figure 10 illustrates a graphic comparison of two cyclic signals utilized in the invention;

Figure 11 is a graphic illustration similar to Figure 10, but illustrating another condition existing between the two signals;

Figure 12 is a plan view of another embodiment of the invention;

Figure 13 is an end view of the embodiment illustrated in Figure 12;

Figure 14 is a plan view similar to Figure 12 but with certain portions being shown in section for purposes of clarity;

Figure 15 is an enlarged detail view of a trace formed on a control record which is utilized in the invention;

Figure 16 is a view similar to Figure 15 but illustrating a different condition of the trace illustrated in Figure 15;

Figure 17 is a graphic illustration of two cyclic signals utilized with the embodiment of Figure 12; and Figure 18 is a graphic illustration similar to Figure 17 but illustrating another condition of the signals.

Like elements are designated by like characters throughout the specification and drawings.

Referring specifically now to the drawings, and in the first instance to Figure 1, I illustrate a control record which is designated at 1. The control record or signal storage member 1 may take the form of an elongated and relatively thin stainless steel tape which is capable of storing magnetic impressions. Records having magnetic properties of this type are well known to the art and for this reason the record 1 may be formed of many different materials while having equivalent magnetic storage properties.

Designated generally at 2 is a source of magnetic flux which is impressed upon the record 1. The source is shown as including a Mumetal loop 3, the legs of which pass through a pair of induction coils 4 and 5 which terminate beneath the control record in spaced lips 6 and 7 which provide a free gap 8 therebetween. When alternating current or when an alternating signal is supplied to the coils 4 and 5 through leads 9 and 10 a flux path is established through the Mumetal loop and through the control record 1 between the lips 6 and 7. As the control record 1 is advanced in one direction such as, for example, in the direction of the arrow illustrated in Figure 1, the record will be impressed with a magnetic area of predetermined characteristics along the entire width of the control record.

Positioned above the record and the gap 8 is a flux regulating structure 11 which may be formed of Mumetal or other material having relatively high permeability to low flux densities. Regulating structure 11 in this embodiment takes the form of a helical screw which is fitted onto a shaft 12.

In a typical recording system there may be two, three or more control channels provided along the length of the control record. In such an instance, a source of flux and a regulating structure similar to that illustrated in Figure 1 is employed with the control record 1 as I illustrate in Figure 2. In Figure 2 a single Mumetal helical screw 11 is positioned over the width of the control record and a plurality of sources of cyclically varying flux similar in all respects to that illustrated in Figure 1 are positioned side by side, beneath the record. I illustrate, for example, a magnetic coil structure 13 which is for one control channel, another coil structure 14 for another control channel and a third coil structure 15.

According to the principles of the invention, a structure such as is illustrated in Figures 1 and 2 may be supported in a housing shown at 16 in Figure 3 and the helical screw 11 is adapted for continuous rotation by a two-pole synchronous motor 17.

In Figure 4, which illustrates a sectional view of the assembled record, flux regulating structure and source of flux, an insulating structure 18 is shown as surrounding the flux regulator 11 and the coil structure 14.

In this embodiment of the invention, the helical screw is rotated at a continuous speed which may, for purposes of discussion, be taken to be 60 revolutions per second. The flux regulating structure 11 serves to confine the flux impressed on the control record to predetermined areas. This is due to the action of threads on the helical screw. Since the threads of the screw are spaced closely adjacent to the surface of the control record, they may act to shunt or divert flux from the control record at those areas immediately beneath the threads. The screw may be considered as part of the magnetic circuit including coil structure and record. The areas beneath the threads will have certain magnetic characteristics while the areas beneath the spaces between the threads will have different magnetic characteristics. When the signal supplied to the coils 4 and 5 is maintained at a frequency corresponding to the speed of rotation of the screw 11, the flux established or impressed upon the control record will be in precisely the same relative lateral position. If the record is continually advanced as shown by the arrow in Figure 1 while the screw 11 is rotated at the same speed as the frequency supplied to the coils 4 and 5, the threads of the screw will generate generally parallel traces along the length of the control record and these traces will be generally parallel to the direction of movement of the control record as shown by traces 26 in Figure 9. With a structure such as is illustrated in Figure 2, there will be three groups of traces generated or impressed on the control record thus forming a magnetic pattern in three control channels. The first group will be immediately above the source of flux 13, while the second will be above the source of flux 14, and the third will be above the source of flux 15.

Figures 5 through 9 illustrate a modified form of magnetic circuit and in these figures the control record is designated generally at 19 and is adapted for movement in one direction such as, for example, in the direction of the arrow illustrated in Figure 6. A two-pole synchronous motor 20 is employed to continuously rotate a plurality of flux regulating structures 21 and 22. In these figures, however, a path of flux is established through the body of the Mumetal flux regulating structure, the control record 19 and a magnetic transmissive lamination 23 which, as shown, passes through induction coils 24 and 25 and terminates closely adjacent to the body of the flux regulator. This is illustrated most clearly in Figure 7. In this embodiment of the invention, however, the two flux regulating structures 21 and 22 which take the form of helical screws similar to that illustrated in Figure 2, are magnetically isolated. In this embodiment of the invention, a cyclically varying signal is supplied to the coils 24 and 25 at the same base frequency as the frequency supplied to the synchronous motor 20. Thus, since the threads of the screw will advance a distance equal to the pitch of the threads during one revolution of the screw a plurality of flux paths will be established through the control record 19 at precisely the same relative lateral position so long as the speed of the motor 20 corresponds to the base frequency of the signal supplied to the coils 24 and 25. In this particular embodiment, however, traces are recorded through the body of the record in such a manner that the magnetized areas or flux transmissive areas appearing on the record may be assumed to have a north polarity at the upper surface of the area and a south polarity at the lower surface thereof. The flux regulator 22 may have a similar magnetic circuit comprised of a magnetic Mumetal lamination 23a, and coils 24a and 25a associated therewith.

In both the embodiment illustrated in Figures 1 through 4 and the embodiment illustrated in Figures 5 through 8, the traces of predetermined magnetic characteristics are generated along the length of the record, as appears in Figure 9. In this figure, the flux regulators 21 and 22 are illustrated, although for some applications they may be considered to be equivalent to the single flux regulator 11 illustrated in Figure 2. In Figure 9, one group of traces associated with the regulator 21 appears at 26 while a second group of traces 27 is generated by the flux regulator 22. It should be noted that the traces 26 are illustrated as extending parallel to the direction of movement of the record indicated by the arrow in Figure 9. The second group of traces 27 are illustrated as having a predetermined angulation or transverse displacement with respect to the direction of movement of the record to illustrate a condition caused by a relative phase displacement between the frequency of the signal supplied to the coils and the frequency of the voltage supplied to the motor 20 in Figure 5 or the motor 17 in Figure 3. If, for example, in Figure 10 the frequency of the voltage supplied to the motors is represented by the solid line 28 while the frequency supplied to the coils is represented by the broken lines 29, it will be seen that these two signals are out of phase by 90 degrees with the signal 29 lagging the signal 28 by 90 degrees. If this signal condition occurs and if, during rotation of the regulators 21 and 22 the threads thereof appear to move in the direction of the arrow shown in Figure 9 or from left to right and the record is advanced in the direction shown by the arrow, the traces would be given a transverse displacement from right to left such as is illustrated generally by the displacement at 30 in Figure 9. If, on the other hand, the signal 29 leads the signal 28 by a predetermined amount such as is illustrated generally by the 90-degree leading phase relation illustrated in Figure 11, the traces will be displaced from left to right, such as is indicated by the angulation of the traces at 31.

Figures 12 through 18 illustrate a third embodiment of the invention. In these figures a synchronous motor 32 is employed to rotate a glass disc 33 which has an Archimedes spiral 34 generated on the surface thereof so that the convolutions of the spiral divide the glass disc into alternate light flux transmissive and non-light flux transmissive areas. In this embodiment of the invention, the flux regulator formed by the Archimedes spiral is associated with a control record 35 in the form of a light sensitive photographic film which may be positioned as shown in Figure 12. In this figure, the record 35 is adapted to be advanced from left to right, as indicated by the arrow in Figure 12, while the disc 33 is rotated in a counterclockwise direction. During such rotation the convolutions of the spiral will appear to move outwardly from the center of the disc. A member 36 is positioned between the flux regulator 33 and the record and is provided with a pair of light apertures in the form of slots 37 and 38. Light is projected through these apertures from a pair of stroboscopic light sources 38a and 39. Source 38a projects light through a lens 40 through the aperture 38 and on to the record 35. The source 39 projects light through the lens 41, the flux regulator 33, aperture 37 and on to the record 35. If the flux regulator 33 is stationary, light projected on to the film 35 would result in a first group of exposed traces formed by the light passing through the light transmissive areas of the spiral and through the aperture 38, and a second group of exposed areas formed beneath the light transmissive areas of the spiral beneath the aperture 37. Thus, with the flux regulator 33 stationary, and if the light sources were of constant amplitude, two groups of generally parallel traces (formed by the exposed areas) would be impressed upon the control record 35 during movement of the record 35. According to the invention, however, the flux regulator 33 is driven at a generally constant speed say, for example, 60 revolutions per second. Thus, the convolutions of the spiral will appear to move outwardly at the rate of one pitch per second. If the light sources 38a and 39 have the same frequency as the voltage supplied to the motor 32, light will be projected through the slots 37 and 38 at precisely the same points taken transversely of the record, since during one second one opaque area of the spiral will have moved into the previous position of an adjoining opaque area.

It should be understood that the light sources 38a and 39 are of a conventional and well-known stroboscopic type wherein they supply a pip of light which is extinguished immediately after firing. If the frequency supplied is 60 cycles per second, they light up and are extinguished 60 times per second.

As long as the frequency of the signal supplied to the light source is in phase with the frequency of the signal supplied to the motor 32, the traces impressed on the control record will be generally parallel to the direction of movement of the control record. Figure 17 illustrates the in-phase condition. In this figure, the solid line illustrates the signal or frequency supplied to the motor 32 and is designated at 43, whereas the signal supplied to the light source is represented by the broken line as at 44. If, however, the signal supplied to the light source 39 leads the frequency of the motor 32 by a predetermined number of degrees, say, for example, 60 degrees, as is illustrated in Figure 18, a displacement of the traces relative to the direction of movement of the record is achieved. Such a displacement is illustrated generally by the group of traces 45 in Figure 14, whereas the second group of traces generated adjacent the aperture 38 are designated at 46 and are shown as generally parallel to the direction of movement of the record.

It should be noted in Figure 14 that the pitch P of the convolutions is equal to the pitch of the traces generated on the control record and the width W is generally equivalent to the width of the traces.

Figure 15 illustrates a trace generated in this embodiment by a lagging phase displacement of 36 electrical degrees. In this figure, the width W of the trace may be assumed to be .03 inch and the pitch of the spiral and traces to be .06 inch. If the signal supplied to light source 39 leads the frequency of the motor 32 in successive increments of six electrical degrees, the trace will be displaced a distance equal to .001 inch for each six-degree electrical phase change.

Figure 16 illustrates a condition wherein one signal has undergone an instantaneous phase change of 60 degrees with relation to the other signal. The areas with the zero degree markings illustrate the trace while the signals are in phase, whereas the areas with the 60-degree markings illustrate a phase change of 60 electrical degrees which results in an instantaneous .01 inch displacement.

In Figures 15 and 16, the traces are represented as having a stepped formation with the steps corresponding in width S to the width of the apertures 37 and 38.

In order to supply a variable phase signal to the coils positioned beneath the records I may employ phase shifting signal generators of the type shown in my co-pending application, Serial No. 137,159, filed January 6, 1950. In that application, I illustrate phase shifting signal generators which are adapted to generate a signal having a generally constant frequency and change the phase in response and in proportion to the linear displacement of a movable member. I may use one or more of this type of signal generators in preparing a control record. Thus, for example, if I wish to trace the outline of a curve which can be resolved into two coordinates of movement, one such phase shifting signal generators will be employed to translate the linear displacement of a member which follows the curve or outline in terms of the X—X coordinate and supply this variable phase signal to the coil assembly beneath one channel on the record. At the same time, I may employ another signal generator for the Y—Y coordinate of movement so that the displacement of a movable member such as a stylus in following the outline of the curve will displace the phase of the signal proportionately and this signal will be supplied to another induction coil assembly alongside the first mentioned coil assembly and positioned adjacent the control record.

Thus, for example, one phase shifting signal generator may supply the coil structure 15 in Figure 2 and the other signal generator for the other coordinate may supply the coil structure 14 in Figure 2. The coil structure 13 may be supplied with the base frequency generated by the signal generators.

Thus, if the phase of the signal supplied to the coil structure 15 varies proportionately to the movement along the X—X coordinate, the traces formed on the control record 1 will be displaced proportionately during continuous speed rotation of the scanner or regulator 11. The signal supplied to the coil structure 14 will also vary proportionately to the movement of the movable member along the Y—Y coordinate and thus displace the traces proportionately in this channel on the control record 1.

In lieu of using phase shifting signal generators of the foregoing type, it may, under certain circumstances, be advantageous to employ rotary resolvers, it being understood that one such resolver will ordinarily be employed for each coordinate of movement.

The foregoing signal generating and recording technique may also be advantageously employed in connection with the recording of voltage, etc. In the case of voltage, for example, a volt meter may measure the voltage at any particular time and rotate the armature shaft of a resolver to shift the phase of the signal of the resolver proportionately to the voltage. The phase shift in the signal generated is thus recorded in terms of displacement of traces. The volt meter could, of course, be employed to move one movable element of the phase shifting signal generators found in my co-pending application, Serial No. 137,159, and thus generate a signal whose phase varies proportionately to changes in the voltage.

It should be understood that I use the term stylus to represent some method for resolving a curve into its coordinates which are recorded in terms of the traces.

In each form of the invention, I vary the phase of flux imparted to the control record proportionately to variations in the variable quantity being recorded. In each form of the invention the regulating structures move transversely to the record as a generally constant rate while the record is undergoing its longitudinal movement. Thus the traces recorded will have a displacement which corresponds to the change in the variable whether it be the movement of a machine tool element or the variation in a physical quantity such as voltage or the like.

In all forms of the invention I employ a source of flux to create a predetermined condition on a control record and I employ a plurality of flux regulating members which move transversely to the record at a generally constant rate. When the source of flux supplied to the record has the same frequency or rate, the flux regulating members confine the flux to the same relative lateral position on the record. Thus, during movement of the record with respect to the source of flux and the flux regulating members, generally parallel and elongated traces result. I impart a displacement of these traces proportional to the changes of the magnitude of a variable by varying the frequency of the flux, or by bringing about a phase change in the flux. This phase change is proportional to the change in the variable and it results in a proportional displacement of the traces generated on the control record.

In each form of the invention I generate parallel traces in such a manner that when the traces are displaced sufficiently that one trace intersects an edge of the control channel, another trace will appear on the other side of the control channel. Thus, the extent of the displacement of the traces is unlimited. Furthermore, the generation of the plurality of traces results in an averaging effect when the record is later used for controlling a machine tool, for controlling a process.

The use, operation and function of the invention are as follows:

This invention pertains to the recording of certain types of intelligence on signal storage members in such a manner that the recorded data can be reproduced at some future date. The signal storage members may take any appropriate form such as suitable drums, disks or ribbon-like tape. Either light flux or magnetic flux may be used as the recording media.

The herein disclosed recording techniques are especially adapted to record data which is in the form of electrical phase or time displacements of one or more cyclically varying signals relative to a reference signal whose fixed phase and frequency provides a time axis.

Many forms of intelligence can be translated into electrical phase displacements whose magnitude and sign (+ or —) can represent from instant to instant the precise magnitude and sign of some measurable quantity or quality.

As an example, by the use of various types of well-known phase shifters the rate, direction and magnitude of displacement of a lathe carriage can cause a cyclically varying signal to be shifted along a time axis by amounts and in a direction exactly reflecting the carriage movement. Many other forms of intelligence can be translated into electrical phase displacements which may be fixed or may be continuously varied by suitable amounts.

Thus the instantaneous magnitude of a measurable quality or quantity of matter or energy, such as velocity, humidity, fluid flow, voltage, amperage, etc. can be translated by the use of various types of phase shifting devices into proportional phase displacements. Similarly, many mathematical functions, curves and the like, can be represented from instant to instant by the shifting of a cyclically varying signal along a time axis by proportional amounts.

The herein disclosed techniques, as will be shown, are highly adapted to record the above described forms of intelligence upon various types of signal storage members so at any future time cyclically varying signals can be reproduced whose phase at any instant faithfully represent any magnitude recorded.

By the use of the invention, a very great amount of recorded intelligence can be impressed on one or more very short channels on a signal storage member.

As an example, if desired displacement of a machine tool element at a future time is recorded by the use of the invention on a magnetized tape, only 2 cm. length of this tape is required for each 1 cm. movement of the element. This results in great economies in cost, makes possible very slow tape speeds during the reproducing cycles and the storage of a large quantity of intelligence on a small storage reel.

By use of the invention, magnetic signal storage members, such as magnetizable tape, can be recorded in such a manner that the magnitude of any reproduced signal is in many instances several hundred times greater than conventionally recorded magnetic tapes.

The herein described techniques allow recordings to be impressed on a signal storage member over a very large range of recording speeds. Thus, as an example, a magnetized tape can be recorded while it is drawn past the recording means at the rate of 1 cm. per second or at the will of the operator, or at a rate of .1 meter per second, if desired. Furthermore, under certain conditions the tape can be stopped by the operator during a recording cycle with no loss of recorded signal strength.

By the use of the instant invention, signal storage members can be recorded in such a manner that during the reproduction cycle the storage member can be displaced past the reproducing head over a very large range of speeds without any change in the strength of the reproduced signal. The signal storage member can even be static without any decrease in the magnitude of the reproduced signal.

Whereas I have shown and described an operative form of my invention, I wish it to be understood that there are many forms of modification to the invention which will fall within the scope and spirit of the invention and which will be apparent to those skilled in the art. Therefore, I do not wish my invention to be limited except as by the scope of the appended claims.

I claim:

1. The method of recording displaced traces representative of changes in a variable on a moving storage medium including the steps of generating a cyclic reference signal having a predetermined base frequency, generating a variable frequency signal, varying the phased relations of said signals as a function of changes in the variable, and displacing the traces with respect to the direction of movement of the storage member in response to the phase differential between said signals.

2. The method of recording the motions of a movable member on a control record including the steps of generating a first cyclic signal having a standard frequency and generating a second cyclic signal having a base frequency corresponding with the frequency of said first signal, varying the phase of said second signal in response to movement of said member and impressing indicia on a control record, the characteristics of said indicia varying as a function of the phase difference between said two signals.

3. The method of recording a trace on a control record with the displacement of the trace from instant to instant corresponding to the displacement of a movable member including the steps of generating a first cyclic signal having a generally constant frequency, generating a second cyclic signal having a base frequency corresponding with the frequency of said first signal, varying the phase of said second signal in response to movement of said movable member, and displacing the trace on said control record as a function of the phase difference between said first signal and said second signal.

4. A recording assembly for recording the changes in a variable in terms of the displacement of traces on a storage medium including a flux sensitive record, a source of cyclically varying flux and means for impressing said flux on said record in spaced defined areas to thereby generate parallel traces during movement of said record, means for generating a reference signal at a predetermined base frequency, means for moving said record with relation to said source, and means for varying the phase of said flux with relation to the phase of said signal as a function of changes in a variable to displace the traces impressed on said record in amounts and directions proportional to said phase variance.

5. The method of recording displaced traces representative of changes in a variable on a moving storage medium including the steps of projecting cyclically varying flux at a predetermined frequency on to a flux sensitive and retentive storage medium in spaced, defined areas, while moving said medium, moving a plurality of spaced flux differentiating members transversely to the direction of movement of said medium at a constant rate corresponding to said frequency, and varying the phase of said flux as a function of changes in a variable while maintaining the rate of movement of said flux differentiating members and thereby imparting displacement to said traces proportional to said phase variance.

6. The method of recording intelligence comprising the steps of impressing on a signal storage member a plurality of generally parallel spaced traces that have flux characteristics that differ from the flux characteristics of the intermediate areas, translating the characteristics of said intelligence from instant to instant into proportional electrical phase displacements, and imparting transverse displacements to said traces as they are impressed proportional to the instantaneous magnitude of said characteristics as reflected in the electrical phase displacements.

7. The method of recording intelligence by impressing a flux transmissive trace on a moving signal storage member, which includes varying the phase of a cyclically varying signal relative to a second cyclically varying signal of reference frequency by amounts and directions proportional to changes in the magnitude of characteristics to be recorded, impressing a trace on the moving signal storage member, and imparting displacement to said trace, as it is being impressed, transverse to the direction of movement of said storage member by amounts and directions instantaneously proportional to the phase relationship between said signals.

8. The method of claim 7 further characterized by and including the step of impressing a plurality of parallel traces on the moving signal storage member, and imparting displacement to said traces.

9. The method of claim 8 further characterized by and including impressing simultaneously a reference trace and an intelligence trace on the storage member.

10. The method of impressing intelligence on a moving storage member comprising providing a cyclically varying signal of reference frequency, providing a second cyclically varying signal normally of reference frequency, impressing a plurality of flux transmissive traces on said signal storage member, varying the instantaneous phase of said second signal relative to said reference signal by amounts and directions proportional to variations in the characteristics of said intelligence, and imparting displacement to said traces, as they are impressed, by amounts and directions proportional to the phase relationships of said signals.

11. A recorder for use with a magnetizable storage member, including flux conducting means on one side of the storage member and having spaced portions so located as to be in flux transmitting relation with spaced points on the magnetizable storage member, an induction device in inductive relation to the flux conducting means, a magnetic distributor element mounted on the other side of the storage member for movements into and out of magnetic flux distributing relationship, and means for moving the distributor element into and out of such flux distributing relation.

12. The structure of claim 11 further characterized in that the spaced portions of the flux conducting means are constructed to be spaced longitudinally of the magnetizable storage member.

13. The structure of claim 11 further characterized in that said last mentioned means for moving the distributor element includes means for moving the element into and out of flux distributing relation on a uniform cyclical basis.

14. The structure of claim 11 further characterized in that the magnetic distributor element includes a plurality of equally spaced distributors constructed to be moved as a unit, while maintaining their relative spacing, into and out of flux distributing relation.

15. A recorder for use with a magnetizable storage member, including flux conducting means having spaced portions so located as to be in flux transmitting relation with spaced points on the magnetizable storage member, an induction device in inductive relation to the flux conducting means, a magnetic distributor element mounted for movement into and out of magnetic flux distributing relation, and means for moving the distributor element into and out of such flux distributing relation.

16. The structure claim 15 further characterized in that the flux conducting means is disposed on one side of the magnetizable storage member and the magnetic distributor element is disposed on the other side.

17. The structure of claim 15 further characterized in that the magnetic distributor element includes a rotatably mounted helix, and further including means for rotating the helix at a generally constant rate of speed.

18. The method of claim 2 further characterized in that the step of impressing indicia on a control record includes the steps of impressing a plurality of generally parallel longitudinally disposed laterally spaced traces on the control record having flux characteristics that differ from the flux characteristics of the intermediate areas, and imparting lateral displacement to the traces, while they are being impressed, by amounts proportional to the phase differences between the swo signals.

19. A method of impressing intelligence on a moving signal storage member, including the steps of providing a first cyclically varying signal of reference frequency, providing a second cyclically varying signal normally of reference frequency, impressing a plurality of generally longitudinally disposed laterally spaced traces on the signal storage member having flux characteristics that differ from the flux characteristics of the intermediate areas, varying the instantaneous phase of the second signal relative to the first signal by amounts and directions proportional to variations in the characteristics of the intelligence, and imparting lateral displacement to the traces, as they are impressed, by amounts proportional to the phase relationship of the signals.

20. The method of claim 19 further characterized by and including the step of making each of the traces continuous and unbroken as they are impressed.

21. The method of claim 19 in that the thus impressed traces have flux characteristics of a magnetic nature, and further characterized by and including the step of simultaneously impressing a plurality of reference traces corresponding to the first signal and a plurality of intelligence traces corresponding to the phase relationship of the signals.

22. The method of recording displaced traces representative of changes in a variable on a moving storage medium including the steps of generating a cyclic reference signal having a predetermined base frequency, generating a second cyclic signal, said cyclic signals having the same frequency, varying the phased relations of said signals as a function of changes in the variable, and displacing the traces with respect to the direction of movement of the storage member in response to the phase differential between said signals.

References Cited in the file of this patent

UNITED STATES PATENTS

| | | |
|---|---|---|
| 2,124,030 | Douden | July 19, 1938 |
| 2,188,650 | Clark | Jan. 30, 1940 |
| 2,245,286 | Marzocchi | June 10, 1941 |
| 2,352,023 | Schuller | June 20, 1944 |
| 2,423,339 | Newman | July 1, 1947 |
| 2,628,285 | Camras | Feb. 10, 1953 |
| 2,628,539 | De Neergaard | Feb. 17, 1953 |